United States Patent

Klann

[11] Patent Number: 5,966,788
[45] Date of Patent: Oct. 19, 1999

[54] SPRING VICE FOR TENSIONING COIL SPRINGS WITH TWO PRESSURE PLATES

[75] Inventor: Horst Klann, Villingen-Schwenningen, Germany

[73] Assignee: Klann Tools Ltd., Didcot, United Kingdom

[21] Appl. No.: 09/023,007

[22] Filed: Feb. 12, 1998

[30] Foreign Application Priority Data

Feb. 15, 1997 [DE] Germany ........................ 297 02 673 U

[51] Int. Cl.$^6$ ..................................................... B23P 19/04

[52] U.S. Cl. ............................................ 29/227; 254/10.5

[58] Field of Search ..................... 29/225, 227; 254/10.5; 411/104

[56] References Cited

U.S. PATENT DOCUMENTS

| | | | |
|---|---|---|---|
| 4,009,867 | 3/1977 | Diffenderfer | 29/227 |
| 4,809,951 | 3/1989 | Klann | 29/227 |
| 4,872,645 | 10/1989 | Dossier | 29/227 |
| 5,564,172 | 10/1996 | Klann | 254/10.5 |
| 5,680,686 | 10/1997 | Bosche et al. | 29/227 |

FOREIGN PATENT DOCUMENTS 37 20 018 C2  9/1988  Germany .

OTHER PUBLICATIONS

1994, Klann–Federspanngerate fur Quer–und . . . , *Klann Werkzeuge Catalog*.

*Primary Examiner*—Robert C. Watson
*Attorney, Agent, or Firm*—McGlew AND Tuttle, P.C.

[57] ABSTRACT

A spring vice (56) for tensioning coil springs, which have a spindle drive (59, 61), which has approximately wedge-shaped radial fingers (64, 65, 66) at one of its ends and a support cylinder (60) with a contact element at its other end. Two pressure plates (57, 58) with a passage opening (77, 87), through which the spindle drive (59, 61) can be passed, are used to tension a coil spring. In the mounted state, the radial fingers (64, 65, 66) of the spindle drive (59, 61) can be brought into a nonrotatable pulling connection with locking recesses (81, 82, 83) of the first pressure plate (57), while the second pressure plate (58) without locking recesses is supported axially at the contact element of the support cylinder (60) of the spindle drive (59, 61) for tensioning the coil spring. To increase the safety of operation, provisions are made for the contact element of the support cylinder to have support fingers (72, 73, 74), whose number corresponds to the number of the radial fingers (64, 65, 66). The second pressure plate (58) has a design substantially identical to that of the first pressure plate (57) and it likewise has locking recesses (91, 92, 93). Thus, the first and second pressure plates (57 and 58) with their locking recesses (81, 82, 83, 91, 92, 93) of their respective passage openings (77, 87) can be caused to engage optionally the support fingers (72, 73, 74) of the support cylinder (60) or the radial fingers (64, 65, 66) of the spindle drive (59, 61).

9 Claims, 3 Drawing Sheets

5,966,788

SPRING VICE FOR TENSIONING COIL SPRINGS WITH TWO PRESSURE PLATES

FIELD OF THE INVENTION

The present invention pertains to a spring vice for tensioning coil springs, especially of motor vehicles, comprising at least one spindle drive, at one end of which at least two radial fingers of a wedge-shaped design are provided, and at the second end of which a support cylinder with a contact element is provided, and a first pressure plate and a second pressure plate, which have at least one passage opening with a number of radial expansions corresponding to the number of radial fingers for passing through the spindle drive with its radial fingers, wherein the passage opening of the first pressure plate is provided with locking recesses in the radial area of its radial expansions in the circumferential direction between the radial expansions, wherein the radial fingers of the spindle drive can be brought into a nonrotatable pulling connection with the locking recesses, and wherein the second pressure plate is axially supported at the contact element of the spindle drive for tensioning the coil spring.

BACKGROUND OF THE INVENTION

A spring vice of this type has been known (DE 37 20 018 C2), which has two pressure plates, which have an approximately dish-shaped design. These pressure plates can be loosely inserted into the spring turns of a coil spring to be tensioned and can be tensioned in relation to one another by means of a spindle drive. The distance between the two pressure plates is reduced by the spindle drive during the tensioning process, so that the coil spring becomes shorter and is thus tensioned. This prior-art spring vice is designed as a telescopic coil spring, whose spindle drive has a threaded spindle with a spindle head having a key profile, which is mounted rotatably in a cylindrical guide tube via a thrust bearing. This guide tube has a radial contact surface for supporting the spindle head-side pressure plate. The threaded spindle can be screwed into a cylindrical threaded tube, which, axially displaceably, is in nonrotatable connection with the guide tube through positive-locking guide means. On the circumference of its end section located at a distance from the spindle head, the threaded tube has three radial fingers, via which the threaded tube can be brought into a nonrotatable pulling connection with the second pressure plate. To establish this nonrotatable pulling connection, the pressure plate has a central passage opening, in the edge area of which a corresponding number of locking recesses are arranged on the outside. On the side located opposite the locking recesses in the axial direction, the pressure plate has an approximately ring-shaped contact surface for accommodating a spring turn of the coil spring for tensioning this coil spring.

A radial expansion each is provided between two adjacent locking recesses in the circumferential direction, and the number of these radial expansions likewise corresponds to the number of the radial fingers. To make it possible to bring the threaded tube into nonrotatable pulling connection with the pressure plate, the threaded tube with its radial fingers is passed through the passage opening with its expansions and is rotated around the longitudinal central axis of the threaded tube to the extent that the radial fingers can engage the corresponding locking recesses belonging to them in a positive-locking manner when the threaded tube is moved toward the pressure plate in the opposite direction.

The radial fingers have an essentially wedge-shaped design. The locking recesses present in an equal number on the outside of the pressure plate located at a distance from the spindle head as well as the radial expansions of the passage opening located between two locking recesses each are countersunk with an oblique surface such that there is no flat contact surface for the radial fingers at least in the radial area of the radial fingers outside the locking recesses. It is ensured due to this special design of the locking recesses and of the radial expansions as well as due to the wedge-shaped design of the radial fingers that a pulling connection can reliably occur only when a nonrotatable positive-locking connection is formed at the same time between the radial fingers and the pressure plate. Thus, a slight rotation of the threaded tube after the passage through the radial expansions of the passage opening is sufficient to slide into the locking recesses during the movement in the opposite direction along the countersinkings having oblique surfaces.

The second pressure plate, which lies on the radial contact surface of the guide tube, likewise has a passage opening with radial expansions. These radial expansions are used to pass the spindle drive with the radial fingers of its threaded tube first through the second pressure plate and then through the first pressure plate from one side with the pressure plates inserted into the coil spring. The diameter of the passage opening is adapted to the guide tube and to the contact surface thereof and is made slightly larger than the passage opening of the first pressure plate. Furthermore, the second pressure plate has no locking recesses between the radial expansions, which locking recesses could be engaged by the radial fingers of the threaded tube in a positive-locking manner when the first pressure plate is replaced with the second pressure plate. This in turn means that if the two pressure plates are transposed by mistake, there is a risk that the radial fingers can slide off from the contact surface formed by the edge areas of the passage opening of the second pressure plate, so that a tensioned coil spring could be abruptly released in this case, which implies a considerable risk of injury to the operating personnel. Since this prior-art spring vice is designed as a telescopic spring vice, the spindle drive becomes shorter while the threaded spindle is being screwed into the threaded tube.

Another spring vice (Catalog of the firm of Klann Werkzeuge, 1994) has been known, which has essentially the same design as the above-described telescopic spring vice. This second spring vice differs from the telescopic spring vice by the design of its spindle drive. The spring vice has as the spindle drive a threaded spindle, at one end of which the above-mentioned radial fingers are arranged. A pressure cylinder or pressure piece is nonrotatably and axially displaceably guided on this threaded spindle. A thrust bearing, via which the pressure piece is supported at an adjusting nut in the axial direction, is provided in the pressure piece. The adjusting nut can be screwed onto the threaded spindle to tension a coil spring. Two pressure plates are likewise provided in this prior-art spring vice. The first pressure plate likewise has a central passage opening with locking recesses and radial expansions located between them in the circumferential direction.

The second pressure plate is likewise provided with a central passage opening with radial expansions, wherein the areas between the radial expansions of the passage opening form contact sections, with which the second pressure plate is supported at a radial contact surface of the pressure piece. This second pressure plate is guided with its passage opening centered on a cylindrical section of the pressure piece, which cylindrical section is arranged at the pressure piece on its end located opposite the thrust bearing and its diameter is smaller than the radial contact surface of the pressure piece. The diameter of the passage opening of the second pressure plate is adapted for guiding to the dimensions of the cylindrical section and is made correspondingly somewhat larger than the diameter of the passage opening of the first pressure plate.

This prior-art spring vice also involves a considerable risk of accident when the two pressure plates are transposed by mistake. This risk of accident results from the missing locking recesses of the second pressure plate, so that when the pressure plates are transposed, the radial fingers of the threaded spindle cannot engage the locking recesses in a nonrotatable, positive-locking manner, so that the radial fingers can slide off from the contact surface of the passage opening of this second pressure plate during the tensioning as well as the release of a coil spring. Even though an accidental transposition of the pressure plates can be recognized in a simple manner due to the different diameters of the passage openings of the two pressure plates, a transposition of the pressure plates may nevertheless happen, especially if a plurality of identical spring vices are used in the same plant and only the pressure plates without locking recesses of two spring vices are used together with a spindle drive of one of the spring vices to tension a coil spring.

SUMMARY AND OBJECTS OF THE INVENTION

The primary object of the present invention is therefore to improve a spring vice of this type such that safe handling is reliably guaranteed even if the pressure plates are transposed by mistake.

This object is accomplished according to the present invention by the contact element of the support cylinder being formed by support fingers, whose number corresponds to the number of the radial fingers of the spindle drive and by the second pressure plate having the same design as the first pressure plate, and by its passage opening in the radial area of its radial expansions being provided with locking recesses arranged in the circumferential direction between the radial expansions, and by the first and second pressure plates with the locking recesses of their passage openings being able to be brought into a nonrotatable pulling connection optionally with the support fingers of the support cylinder or with the radial fingers of the spindle drive.

Due to the identical design of the two pressure plates, these can be optionally used in connection with the radial fingers of the spindle drive and can be brought into a nonrotatable connection with the radial fingers with their locking recesses. As a result, hazard to the operating personnel in the case of a transposition of the pressure plates is ruled out with certainty. The number of locking recesses corresponds at least to the number of radial fingers or support fingers of the spindle drive, and two or more locking recesses may also be provided in the circumferential direction between two adjacent radial expansions of the pressure plates especially in the case of a larger diameter of the passage openings.

The angular arrangement of the locking recesses is coordinated with the angular arrangement of the radial fingers and of the support fingers such that the pressure plates can be brought reliably into a nonrotatable and centered pulling connection with the support cylinder via the support fingers and with the spindle drive via the radial fingers by associating a locking recess of the corresponding pressure plate with a radial finger and support finger, respectively, in the snapped-in position. To "hang" the spindle drive with its radial fingers into the locking recesses of the pressure plate associated with it, the number of radial expansions corresponds to the number of radial fingers, so that the spindle drive with its radial fingers can be passed through the passage opening with its radial expansions. The dimensions of the radial fingers as well as of the support fingers, both of which have a wedge-shaped design, are coordinated with the dimensions of the locking recesses arranged in the edge areas of the passage openings such that each pressure plate is arranged centered in the passage opening by the radial fingers or even by the support fingers if these are in a nonrotatable connection with the locking recesses.

The support fingers extend in the form of a wedge in parallel to the longitudinal central axis of the support cylinder and project beyond same in the axial direction, and no additional guide cylinder section is preferably provided in the radial direction between the support fingers. Such a guide cylinder section may be additionally provided if the dimensions of the passage opening are correspondingly larger, but it is not absolutely necessary for the centered guiding of the pressure plate on the support fingers.

Furthermore, these geometries of the radial fingers and support fingers and of the locking recesses, which are coordinated with one another, may also be designed, if necessary, such that the pressure plate is seated essentially nonpivotably or at least only minimally pivotably on the radial fingers and on the support fingers. This offers the advantage that, especially if only two radial fingers and support fingers are provided, a coil spring to be tensioned between the pressure plates is additionally guided and cannot bulge out on one side.

Central tensioning of a coil spring is made possible according to the invention, in which case the two pressure plates are first inserted at spaced locations from one another between corresponding spring turns of the coil spring. The threaded spindle with the radial fingers is then passed through both passage openings of both pressure plates, through their radial expansions, one after the other, in the axial direction, and then rotated to the extent that the radial fingers of the spindle drive can be caused to nonrotatably engage, e.g., the locking recesses in the upper pressure plate. By actuating the spindle drive, the support fingers of the support cylinders subsequently enter the locking recesses of the second, lower pressure plate, so that the radial fingers of the spindle drive are in a nonrotatable pulling connection with the upper pressure plate, and the support fingers of the support cylinder are in a nonrotatable pulling connection with the lower pressure plate. The distance between the two pressure plates decreases upon further actuation of the spindle drive, so that the coil spring clamped between same becomes shorter and is thus tensioned.

According to a further aspect of the invention, the pressure plate may also have a horseshoe-shaped design and be correspondingly provided with two diametrically opposed passage openings. Two spindle drives of identical design are needed to tension a coil spring in the case of this embodiment. The passage openings are arranged diametrically opposed to each other in the outer edge area of the pressure plate. It proved to be advantageous in this case for the two passage openings to be arranged symmetrically to a longitudinal central plane of the pressure plate, which extends symmetrically to the two legs of the horseshoe-shaped pressure plate, approximately at right angles to the plane of the pressure plate. Due to this horseshoe-shaped design of the pressure plate and due to the passage openings to arranged in its outer edge areas, a so-called external tensioning of a coil spring can be carried out by alternatingly actuating the two spindle drives, and the distance between the pressure plates can thus be shortened to tension the coil spring.

According to another feature of the invention, the spindle drive may have a threaded spindle, at one free end of which the radial fingers are provided. A pressure piece can be pushed over this threaded spindle and a longitudinal groove, which advantageously extends at least over approximately the entire length of the threaded spindle, is provided in the threaded spindle. This longitudinal groove is engaged by a guide pin or guide web of the support cylinder, which extends radially inwardly into the support cylinder. Due to the longitudinal groove and the guide pin or guide web, the support cylinder is axially nonrotatably displaceable on the threaded spindle.

To reduce the distance between the two pressure plates, an adjusting nut may be provided and the support cylinder is supported at the adjusting nut in the axial direction via a thrust bearing arranged integrated in the support cylinder in one of its end areas.

The support fingers may be arranged at the support cylinder at its end located opposite the thrust bearing and extend approximately in parallel to the longitudinal central axis of the support cylinder. Due to the support fingers being designed tapering in a wedge-shaped manner toward the radial fingers, the support fingers can be caused to engage the locking recesses of the passage openings of the pressure plates in a positive-locking manner, and pivoting of the pressure plates in relation to the longitudinal central axis of the spindle drive is possible at most to a limited extent only, so that an additional guiding of the coil spring to be tensioned is ensured.

The design according to the present invention guarantees safe handling of the spring vice, and the first and second pressure plates may be transposed with one another as desired, and their locking recesses can be brought into a nonrotatable pulling connection optionally with the radial fingers of the spindle drive or with the support fingers of the support cylinder.

The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
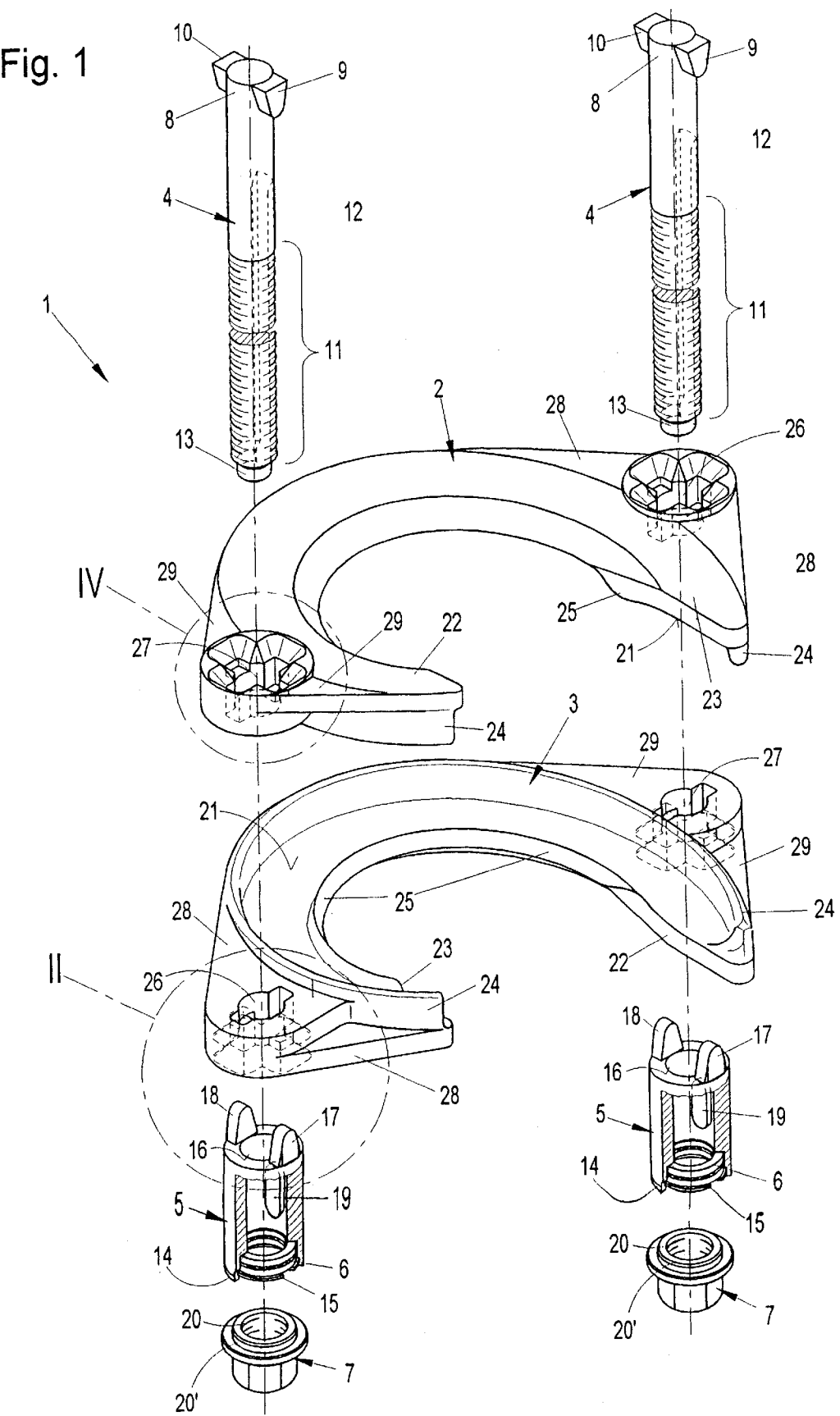
FIG. 1 is an exploded perspective view of a spring vice with two spindle drives and two approximately horseshoe-shaped pressure plates.

FIG. 1 shows the perspective exploded view of an exemplary embodiment of a spring vice 1 according to the present invention. The spring vice 1 comprises a first, upper pressure plate 2, a second, lower pressure plate 3, and two spindle drives. The spindle drives are of an identical design and comprise each a threaded spindle 4, a support cylinder 5 with a thrust bearing 6 and an adjusting nut 7.

At its upper spindle head 8, the threaded spindle 4 has two diametrically opposed radial fingers 9 and 10. Furthermore, each of the threaded spindles 4 is provided with a threaded section 11, which ends under the spindle head 8 and under the radial fingers 9, 10, respectively, and extends to the lower end 13 of the threaded spindle 4, which said end 13 is located opposite the radial fingers 9 and 10.

As can be recognized from the representation shown in broken lines in the drawing, the threaded spindle 4 has a longitudinal groove 12, which extends from the lower end 13 of the threaded spindle 4 to just above the threaded section 11 of the threaded spindle 4.

The support cylinders 5 are provided in their lower end areas with an inner, radially expanded receiving step 14, in which the corresponding thrust bearing 6 is accommodated. A corresponding retaining ring 15 is provided to captively secure the thrust bearing 6 in this receiving step 14.

Two diametrically opposed support fingers 17 and 18, which taper from bottom to top toward their free end in a wedge-shaped manner, are arranged on the top end face 16 of the support cylinder 5 located opposite the thrust bearing 6. The support fingers 17 and 18 are rounded at their upper free ends. Furthermore, the support cylinder 5 has a guide web 19, which extends centrally over a partial section of the axial length of the support cylinder 5 and extends radially into the support cylinder 5 in the inward direction. The dimensions, especially the width, of the guide web 19 are fittingly coordinated with the longitudinal groove 12 of the threaded spindle 4, so that the support cylinder 5 is anally displaceable on the threaded spindle 4 and is nonrotatably in connection with same.

The adjusting nut 7 is provided for axially adjusting the support cylinder 5 on the threaded spindle 4. This adjusting nut has corresponding internal threads 20, with which it can be fittingly screwed onto the threaded section 11 of the threaded spindle 4. To axially support the support cylinder 5 on the adjusting nut 7, the latter has a thrust collar 20', which projects beyond the adjusting nut 7 axially toward the support cylinder 5 and at which the support cylinder 5 with its thrust bearing 6 is axially supported during the adjustment process and during the tensioning of a coil spring.

The two pressure plates 2 and 3 are of identical design, and FIG. 1 shows a perspective bottom view of the first pressure plate 2 and a perspective top view of the second pressure plate 3.

The pressure plates 2 and 3 are approximately horseshoe-shaped or U-shaped and have a contact surface 21 for reliably receiving a spring turn of a coil spring to be tensioned. The contact surface 21 is limited radially to the outside by a circular ring land 24, which extends at least approximately to the ends of the plate legs 22 and 23. To reliably receive this spring turn, the contact surface 21 has a second, inner ring land 25, which extends along the inner edge of the contact surface 21. Furthermore, the contact surface 21 with its ring lands 24 and 25 extends with a slope, which is adapted to the slope of the spring turns of a coil spring to be tensioned.

To bring the spindle drive comprising the threaded spindle 4, the support cylinder 5 and the adjusting nut 7 into a nonrotatable pulling connection with the pressure plates 2 and 3, respective passage openings 26 and 27 are provided at the pressure plates 2 and 3. The passage openings are arranged diametrically opposed in the area of the outer ring land 24 of the pressure plate 2 and 3 and are connected to same in one piece. The passage openings 26, 27 are part of a respective support plate 28 and 29, which are adapted to the shape of the respective pressure plates 2 and 3 and are reinforced in the area of the corresponding passage opening 26 and 27, respectively.

Figure 2:
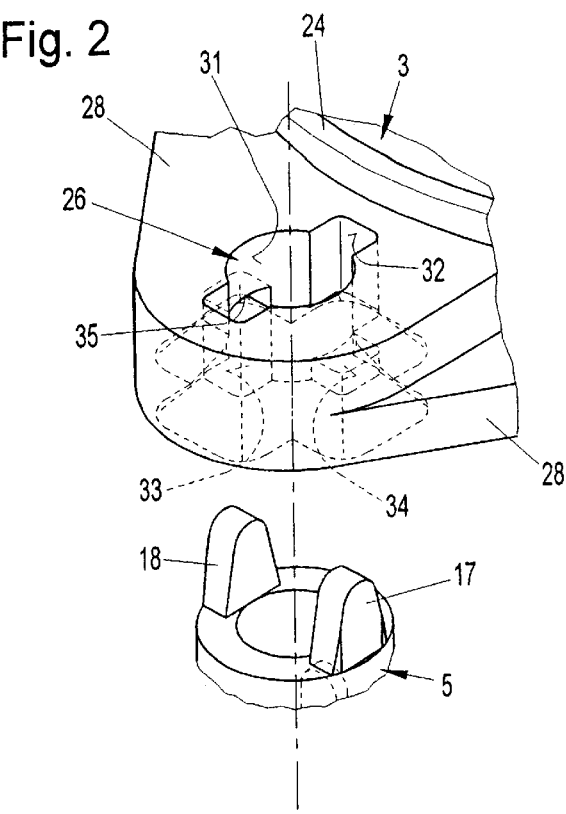
FIG. 2 is an enlarged view of detail II of FIG. 1, showing the passage opening with the upper end section of a support cylinder.
Figure 4:
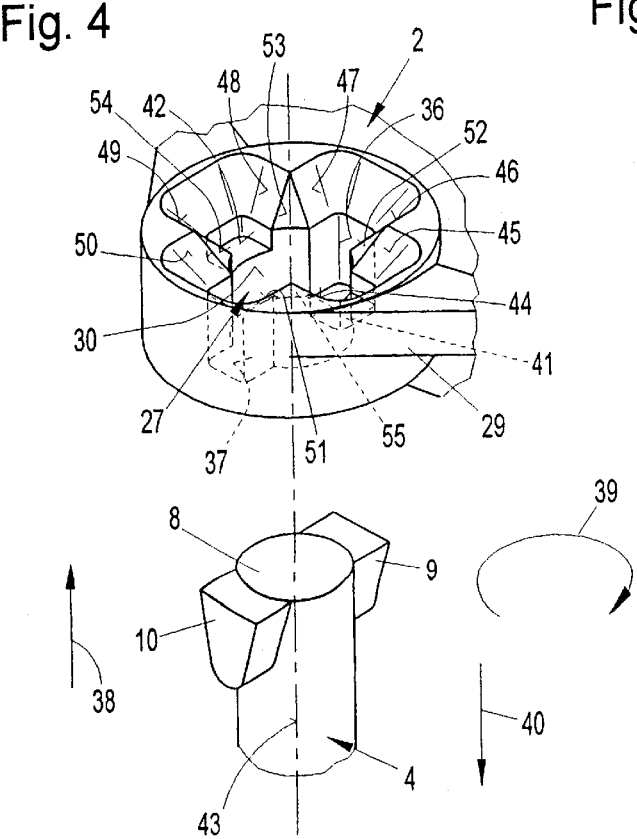
FIG. 4 is an enlarged view of detail IV from FIG. 1 with the upper end of a spindle drive.

As is apparent especially from FIGS. 2 and 4, the passage openings 26, 27 are essentially cylindrical passage holes 30 and 31, respectively.

The passage openings 26 and 27 are identical, so that the following description of the passage opening 26 also applies to the passage opening 27 of the pressure plates 3 and 2, respectively.

The passage hole 31 of the passage opening 26 shown in FIG. 2 has two diametrically opposed, radial expansion sections 32 and 33. The dimensions of the radial expansion sections are coordinated with the radial fingers 9 and 10 of the threaded spindle 4 such that the radial fingers 9, 10 of the threaded spindle 4 can be passed through the passage opening 26 complete with their radial expansion sections 32 and 33. Two diametrically opposed locking recesses 34 and 35, which are used to receive the support fingers 17 and 18 of the support cylinder 5, are provided at right angles to these radial expansions 32 and 33.

Figure 3:
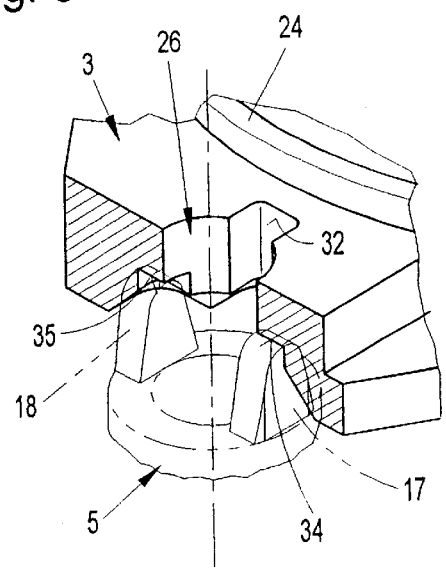
FIG. 3 is a partial perspective view of the passage opening from FIG. 2 with the support cylinder inserted.

As is apparent from FIG. 3, the dimensions of the locking recesses 34 and 35 are coordinated with the support fingers 17 and 18 of the support cylinder 5 such that the support cylinder can be positioned at the pressure plate 3 centered in relation to the passage opening 26. Furthermore, pivoting of the support cylinder 5 in relation to the entire pressure plate 3 is possible to a limited extent only at best because of the selected geometry of the locking recesses 34 and 35 and the geometry of the support fingers 17 and 18.

FIG. 4 shows as an example a perspective top view of the passage opening 27 from FIG. 1. It shall be pointed out here once again that the passage openings 26 and 27 of the pressure plate 2 are designed identically to the passage openings 26 and 27 of the pressure plate 3. The passage opening 26 is shown from the underside in FIGS. 2 and 3, and the passage opening 27 is shown from its top side in FIGS. 4 and 5.

Figure 5:
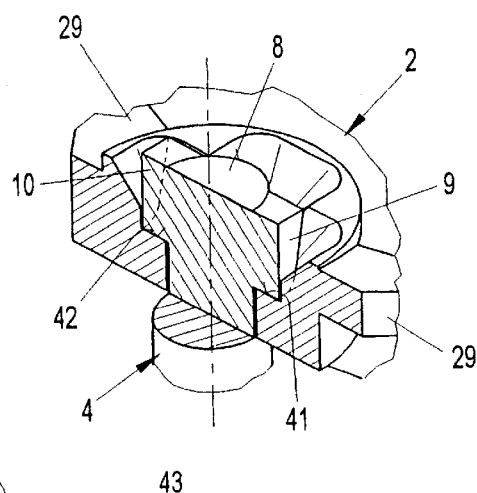
FIG. 5 is a perspective partially perspective view of the passage opening from FIG. 4 with the spindle drive inserted.

The passage opening 27 (and thus also the passage opening 26) comprises an approximately cylindrical passage hole 30, which has two diametrically opposed, radial expansions 36 and 37. As is apparent from FIG. 4, the threaded spindle 4 with its radial fingers 9, 10 can be passed completely through the passage opening 27 in the position shown in FIG. 4 in the direction of arrow 38. After passing the threaded spindle 4 with its spindle head 8 through the passage opening 27, it is rotated in the ideal case by about 90° in the direction of the arrow 39 and is moved back in the direction of arrow 40. As is shown in FIG. 5, the radial fingers 9 and 10 can be brought by this process into a positive-locking engagement with the corresponding locking recesses 41 and 42 of the passage opening 27. As is apparent from FIGS. 2 through 5, the support fingers 17 and 18 as well as the radial fingers 9 and 10 have an approximately wedge-shaped design and their general shape is identical. It is achieved as a result that the support fingers 17 and 18 or the radial fingers 9 and 10 can be fittingly brought into a positive-locking engagement with the locking recesses 34 and 35 as well as 41 and 42. Due to the mutually coordinated dimensions of the locking recesses 34, 35 as well as 41, 42 and of the support fingers 17, 18 and of the radial fingers 9, 10, a central guiding of the threaded spindle 4 in relation to the passage opening 27 and 26 as well as of the support cylinder 5 in the correspondingly associated passage openings 26 and 27 is achieved. Pivoting of the threaded spindle 4 around a pivot axis extending at right angles to its longitudinal central axis 43 is possible to a limited extent only.

To reliably pass the radial fingers 9 and 10 into the locking recesses 41 and 42 of the passage opening 27 after passing them through the passage opening 27, oblique guide surfaces 44, 45, 46, 47, 48, 49, 50, and 51 are provided, as is shown in FIG. 4, in the circumferential area between the radial expansions 36 and 37 and the locking recesses 41 and 42, so that there is no horizontally extending contact surface at least in the circumferential area of the radial fingers 9 and 10. Truncated cone-shaped conical surfaces 52, 53, 54, and 55, which taper to a point toward the top side in an approximately triangular pattern, are formed due to these oblique guide surfaces 44 through 51 between the radial expansions 36 and 37 and the adjacent locking recesses 41 and 42. It is ensured by this special design of the passage opening 27 with its oblique guide surfaces 44 through 51 and with the conical surfaces 52 through 55 that the radial fingers 9 and 10 slide either only back into the radial expansions 36 and 37 or into the locking recesses 41 and 42 during the snapping-in movement in the direction of arrow 40, so that safe handling is guaranteed during the locking of the spindle drive with its radial fingers 9, 10 into the locking recesses 41, 42. Due to this design, the operating personnel can immediately determine whether the radial fingers 9, 10 are, indeed, securely snapped into the corresponding locking recesses 41 and 42, rather than lying unguided on the top side of the passage opening 27 by mistake. Such an unguided contact would make it possible for the radial fingers 9, 10 to slide off into the radial expansions 36 and 37 during the subsequent actuation of the spindle drive, which would imply a considerable risk of accident, because the radial fingers 9, 10 would be abruptly separated from the passage opening 27, so that a sudden release of the coil spring to be tensioned would take place.

The additional passage openings 26 and 27 of the pressure plate 3 are of a design identical to that of the passage opening 27 of the pressure plate 2 shown in FIG. 4, so that the pressure plates can be transposed with one another as desired. FIG. 4 also shows that the radial fingers 9, 10 are rounded at their lower end, so that they can be reliably engaged with the locking recesses of the passage openings 26 and 27. The support fingers 17 and 18 are likewise rounded in the upward direction in the same manner, so that they can engage the corresponding locking recesses 34, 35 and 41, 42 of the respective associated pressure plate 2 or 3 in a simple manner.

Due to the longitudinal groove 12 of the threaded spindle 4 and the guide web 19 of the support cylinder 5, the radial fingers 9 and 10 of the threaded spindle 4 and the support fingers 17 and 18 of the support cylinder 5 are aligned in a common vertical plane. It is guaranteed as a result that with the radial fingers 9, 10 snapped into the locking recesses of the passage openings 26 and 27, respectively, the support fingers 17 and 18 can be correspondingly snapped into the associated passage openings 26 and 27 of the second pressure plate 3 in a reliable manner, because they are automatically positioned correctly.

Figure 6:
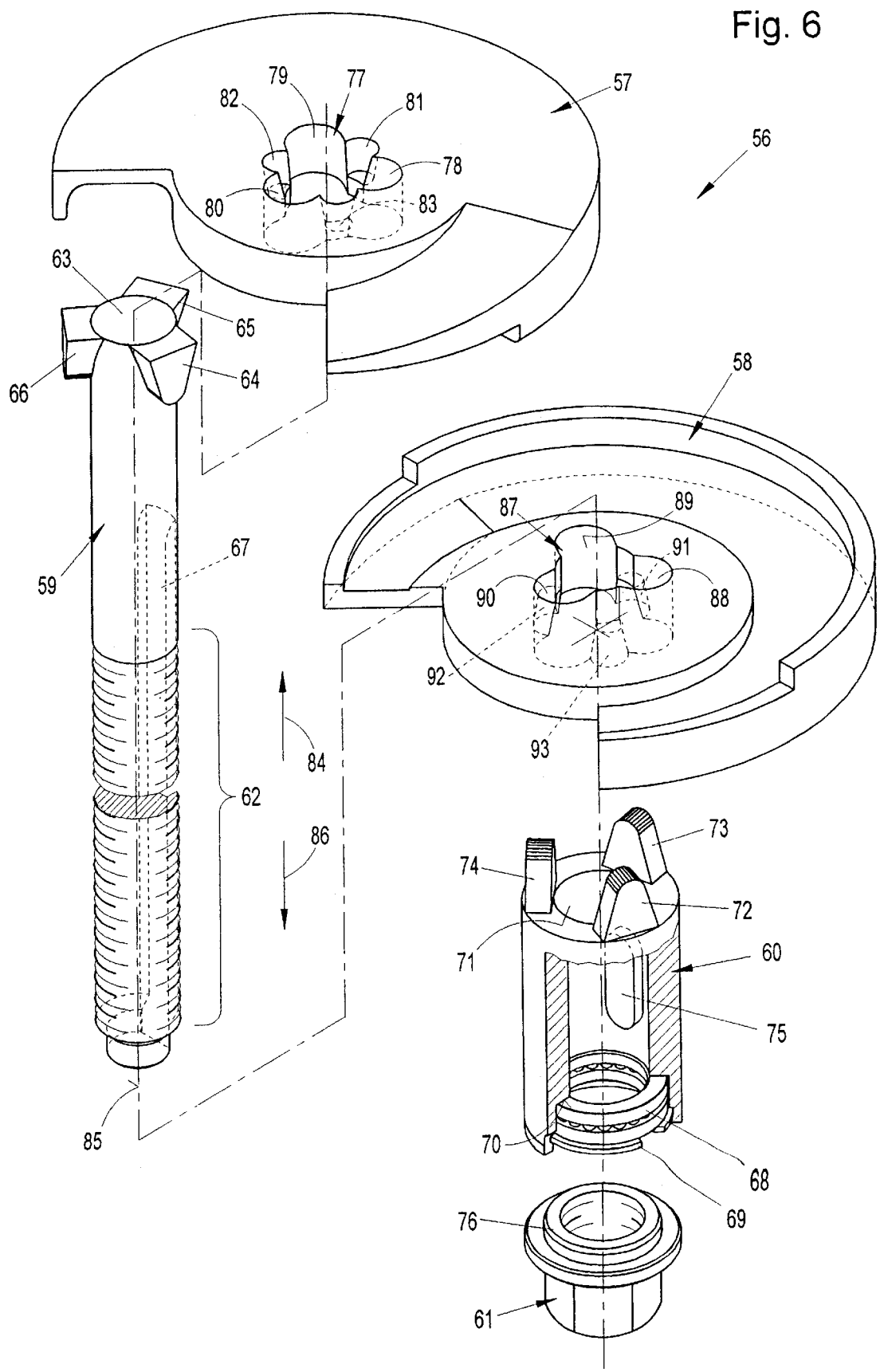
FIG. 6 is an exploded perspective view of another exemplary embodiment of a spring vice with dish-shaped pressure plates and centrally arranged spindle drive.

FIG. 6 shows a perspective exploded view of another exemplary embodiment of a spring vice 56. The spring vice 56 comprises an upper, first and a lower, second pressure plate 57 and 58, respectively, as well as a threaded spindle 59, which forms the spindle drive of the spring vice 56 together with a support cylinder 60 and an adjusting nut 61. The pressure plates 57 and 58 are of identical design, and FIG. 6 shows the bottom view of the first, upper pressure plate 57 and the top view of the lower, second pressure plate 58.

The threaded spindle 59 also has a threaded section 62, which extends axially from the lower end of the threaded spindle 59 approximately to the spindle head 63 of the threaded spindle 59. Three radial fingers 64, 65, and 66, which are offset by 120° in relation to one another and are tapered from top to bottom in a wedge-shaped manner, are provided at the spindle head 63, and their respective "wedge tips" are rounded.

The threaded spindle 59 also has a longitudinal groove 67 (drawn in broken line), which is open in the downward direction and extends approximately up to the top end of the threaded section 62 and approximately to the spindle head 63 of the threaded spindle 59.

The support cylinder 60 is provided with a thrust bearing 68, which is captively mounted by means of a retaining ring 69 in a corresponding inner receiving step 70 in the lower end area of the support cylinder 60. On its end face 71 located opposite the thrust bearing 68, three support fingers 72, 73, and 74 arranged offset by 120° in relation to one another are provided, which are made integrally in one piece with the support cylinder 60. The dimensions of the support cylinder 60 are selected to be such that the support cylinder can be pushed over the threaded spindle 59 with a slight clearance. For the defined alignment of the support fingers 72, 73, and 74 of the support cylinder 60 in relation to the radial fingers 64, 65, and 66 of the threaded spindle 59, the support cylinder 60 has an inner guide web 75, which fittingly engages the longitudinal groove 67 of the threaded spindle 59 in a positive-locking manner when the support cylinder 60 is pushed over the threaded spindle 59. As a result, the support cylinder 60 can be arranged on the threaded spindle 59 nonrotatably and axially displaceably.

The adjusting nut 61, which has a correspondingly dimensioned thrust collar 76 axially projecting on the bearing side for support at the thrust bearing 68, is provided for axially adjusting the support cylinder 60 on the threaded spindle 59.

The pressure plate 57 has a central passage opening 77, which is provided with three radial expansions 78, 79, and 80 offset by 120° in relation to one another. One locking recess 81, 82, and 83 each, which is used to fittingly receive one of the radial fingers 64, 65, and 66 of the threaded spindle 59, is arranged between the radial expansions 78, 79, and 80. The dimensions of the approximately semicylindrical radial expansions 78, 79, and 80 are coordinated with the dimensions of the radial fingers 64, 65, and 66 of the threaded spindle 59 such that the threaded spindle 59 with its radial fingers 64, 65, and 66 can be passed through the radial expansions 78, 79, and 80 in the direction of arrow 84. After rotating the threaded spindle 59 around its longitudinal central axis 85 by an angle of rotation of about 60°, the threaded spindle 59 can be moved back in the direction of arrow 86 to the extent that the radial fingers 64, 65, and 66 fittingly engage the correspondingly associated locking recesses 80, 81, and 82 of the pressure plate 57 to establish a nonrotatable pulling connection. The pressure plate 57 thus connected to the threaded spindle 59 is thus nonrotatably and nonpivotably mounted at the spindle head 63.

As is apparent from FIG. 6, the pressure plate 58 also has a central passage opening 87, which is likewise provided with three radial expansions 88, 89, and 90 arranged offset by 120° in relation to one another. Locking recesses 91, 92, and 93, which can be caused to be fittingly engaged by the support fingers 72, 73, and 74 of the support cylinder 60 in a positive-locking manner, are also arranged between the radial expansions 88, 89, and 90. It can be recognized that the two pressure plates 57 and 58 are absolutely identical and thus they can be caused to engage optionally either the radial fingers 64, 65, and 66 of the threaded spindle 59 or the support fingers 72, 73, and 74 of the support cylinder 60 in a positive-locking manner. The radial expansions 88, 89, and 90 of the pressure plate 58 have the same shape as the radial expansions 78, 79, and 80 of the pressure plate 57, so that the threaded spindle 59 with its spindle head 63 or with its radial fingers 64, 65, and 66 can be passed through both pressure plates or through the two passage openings 87 and 77 of the pressure plates from the underside or from the top side with the pressure plates 57 and 58 inserted into the spring turns of a coil spring. By simply rotating the threaded spindle 59 around its longitudinal central axis 85, the radial fingers 64, 65, and 66 can be caused to engage the correspondingly associated locking recesses, e.g., 81, 82, and 83 of the pressure plate 57, in a positive-locking manner. Due to the support cylinder 60 being aligned via its inner guide web 75 and the longitudinal groove 67 of the threaded spindle 59, the support fingers 72, 73, and 74 are positioned in the circumferential direction identically to the radial fingers 64, 65, and 66 of the threaded spindle 59. Only the adjusting nut 61 must be actuated in this position to move the support cylinder 60 toward the lower pressure plate 58 in the axial direction. The support cylinder 60 now engages with its support fingers 72, 73, and 74 the correspondingly associated locking recesses 81, 82, and 83 of the pressure plate 58, so that the two pressure plates 57 and 58 are secured against rotation in relation to one another.

Due to the fact that this second exemplary embodiment of the spring vice 56 is also designed according to the present invention, interchangeability of the two identically designed pressure plates 57 and 58 is achieved in a simple manner. This avoids the risk of not achieving a positive-locking connection between the radial fingers 64, 65, and 66 of the threaded spindle 59 as well as the support fingers 72, 73, in the case of this transposition.

The dimensions of the radial expansions 78, 79, 80 as well as 88, 89, and 90 and of the locking recesses 81, 82, and 83 and 91, 92, and 93 are coordinated with the geometry of the radial fingers 64, 65, and 66 such that there is no outer axial contact surface for the radial fingers 64, 65, and 66 between the radial expansions 78, 79, and 80 as well as 88, 89, and 90 and the respective adjacent locking recesses 81, 82, and 83 as well as 91, 92, and 93. The spring vice 56 can thus also be handled safely, because the radial fingers 64, 65, and 66 can safely slide either only into the locking recesses 81, 82, and 83 as well as 91, 92, and 93 or into the radial expansions 78, 79, and 80 as well as 88, 89, and 90 of the pressure plate 57 and 58, respectively. An intermediate position is ruled out, so that the possibility that the radial fingers 64, 65, and 66 could accidentally slide out of the associated passage opening 77 or 87 is ruled out with certainty.

The dimensions of both the radial fingers 64, 65, and 66 and the support fingers 72, 73, and 74 in relation to the radial expansions 78, 79, and 80 as well as 88, 89, and 90 of the two pressure plates 57 and 58, respectively, are selected to be such that the pressure plates associated with the radial fingers 64, 65, and 66 as well as with the support fingers 72, 73, and 74 are mounted nonrotatably and essentially nonpivotably coaxially to the longitudinal central axis of the threaded spindle 59 via the radial fingers 64, 65, and 66 as well as the support fingers 72, 73, and 74.

It is obvious that the passage openings 26 and 27 of the pressure plates 2 and 3 may also be provided with three radial expansions and locking recesses arranged between them as well as with a corresponding number of radial fingers and support fingers.

While specific embodiments of the invention have been shown and described in detail to illustrate the application of the principles of the invention, it will be understood that the invention may be embodied otherwise without departing from such principles.

What is claimed is:

1. A spring vice for tensioning motor vehicles coil springs, comprising:

at least one spindle drive with a first end with at least two, substantially wedge-shaped radial fingers, and a second end;

a support cylinder with a contact element provided adjacent said second end, said contact element including support fingers;

a first pressure plate and a second pressure plate, which have at least one passage opening, with a number of radial expansions corresponding to the number of radial fingers, for passing through said spindle drive with its radial fingers, wherein said passage opening of said first pressure plate is provided with locking recesses arranged between said radial expansions in a circumferential direction of said passage opening, and said radial fingers of said spindle drive can be brought into nonrotatable pulling connection with said locking recesses, and wherein said second pressure plate for tensioning said coil spring is axially supported at said contact element of said support cylinder, said number of support fingers corresponding to a number of radial fingers of said spindle drive, said second pressure plate being identical to said first pressure plate and said passage opening of said second pressure plate being provided with said locking recesses arranged in a circumferential direction between said radial expansions in a radial area of said radial expansions, said first and second pressure plate with said locking recesses of said passage openings being movable into a nonrotatable pulling connection with said support fingers of said support cylinder or with said radial fingers of said spindle drive.

2. The spring vice in accordance with claim 1, wherein said support fingers of said support cylinder are substantially wedge-shaped with a shape and size adapted to said locking recesses of said pressure plates such that said pressure plates can be arranged at said support cylinder centered and essentially nonpivotable.

3. The spring vice in accordance with claim 1, wherein:
said pressure plates are substantially dish-shaped; and
said passage openings are arranged centrally in said pressure plate.

4. The spring vice in accordance with claim 1, wherein said pressure plate is substantially horseshoe-shaped or U-shaped and has two diametrically opposed passage openings, which are arranged in said area of said outer edge of said pressure plate symmetrically to a longitudinal central plane thereof; and two spindle drives of identical design are provided for tensioning two said
pressure plates of identical design.

5. The spring vice in accordance with claim 1, wherein said spindle drive is formed by a threaded spindle, which is provided with said radial fingers at one of its free ends, and over which said support cylinder can be pushed.

6. The spring vice in accordance with claim 5, wherein said threaded spindle has a longitudinal groove, into which extends one of a radially inwardly projecting guide pin and guide web of said support cylinder, so that said support cylinder is nonrotatably axially displaceable on said threaded spindle.

7. The spring vice in accordance with claim 5, wherein said spindle drive has an adjusting nut, at which said support cylinder is axially supported via a thrust bearing arranged integrated in said support cylinder in an end area thereof.

8. The spring vice in accordance with the claim 1, wherein a thrust bearing is arranged at said support cylinder at its end located opposite said fingers, said support fingers extend in parallel to said longitudinal central axis of said support cylinder, and taper in a wedge-shaped manner toward said radial fingers of said threaded spindle.

9. A spring vice for tensioning motor vehicles coil springs, comprising:

at least one spindle drive with a first end with a plurality of substantially wedge-shaped radial fingers, and a second end;

a support cylinder with a contact element provided adjacent said second end, said contact element including a plurality of support fingers;

a first pressure plate defining a passage opening with a plurality of radial expansions corresponding to said radial fingers for passing said spindle drive with its radial fingers through said passage opening, said passage opening including a plurality of locking recesses, each of said locking recesses being positioned between two of said radial expansions, said radial fingers of said spindle drive being connectable into a nonrotatable pulling connection with said locking recesses;

a second pressure plate defining a passage opening with a plurality of radial expansions corresponding to said radial fingers for passing said spindle drive with its radial fingers through said passage opening of said second pressure plate, said passage opening of said second pressure plate including a plurality of locking recesses, each of said locking recesses of said second pressure plate being positioned between two of said radial expansions of said second pressure plate, and said support fingers of said support cylinder being connectable into a nonrotatable pulling connection with said locking recesses of said second pressure plate, said second pressure plate is axially supported at said contact element of said spindle drive, said second pressure plate being substantially identical to said first pressure plate.

* * * * *